United States Patent
Gorowski

(10) Patent No.: US 8,911,285 B1
(45) Date of Patent: Dec. 16, 2014

(54) DOUBLE FUNCTION, HAND OPERATED MEAT TENDERIZER WITH QUICK RELEASE CLIP

(71) Applicant: Wiktor E. Gorowski, Koszyce Wielkie-Tarnow (PL)

(72) Inventor: Wiktor E. Gorowski, Koszyce Wielkie-Tarnow (PL)

( * ) Notice: Subject to any disclaimer, the term of this patent is extended or adjusted under 35 U.S.C. 154(b) by 0 days.

(21) Appl. No.: 14/222,020

(22) Filed: Mar. 21, 2014

(30) Foreign Application Priority Data

Aug. 26, 2013 (PL) .......................................... 405130

(51) Int. Cl.
*A22C 9/00* (2006.01)
(52) U.S. Cl.
CPC ...................................... *A22C 9/008* (2013.01)
USPC ........................................................ 452/146
(58) Field of Classification Search
USPC .......... 452/141, 146, 147, 102–105; 241/168, 241/169, 169.1, 169.2, 285.1, 30, 89.4, 95, 241/88.1, 273.2; 222/142.1–142.7
See application file for complete search history.

(56) References Cited

U.S. PATENT DOCUMENTS

| | | | |
|---|---|---|---|
| 4,199,841 A | | 4/1980 | Jaccard |
| 4,212,430 A | * | 7/1980 | Dale et al. ..................... 241/89.4 |
| 4,463,476 A | * | 8/1984 | Jaccard .......................... 452/146 |
| 6,948,670 B2 | * | 9/2005 | Kujawski et al. .............. 241/169 |
| 7,182,685 B2 | * | 2/2007 | Gorowski ...................... 452/141 |
| 7,374,114 B1 | * | 5/2008 | Pekay et al. ................... 241/169 |
| 7,604,191 B2 | * | 10/2009 | Pai ............................. 241/169.1 |
| 7,648,088 B2 | * | 1/2010 | Eikelenberg et al. ........... 241/30 |

FOREIGN PATENT DOCUMENTS

PL    207291    11/2003
PL    211404    10/2004

* cited by examiner

*Primary Examiner* — Richard Price, Jr.
(74) *Attorney, Agent, or Firm* — Dilworth & Barrese, LLP.; Michael J. Musella

(57) ABSTRACT

A double function, hand operated meat tenderizer includes a handle with a blade segment clamped inside said handle; a generally flat plate attached to said handle by at least one slidably moving cylinder attached to a compressed spring, comprising at least one seat including a releasably attached spigot of the cylinder, wherein an end face of said plate is provided with a plurality of projections and flow-through slots aligned in evenly spaced relation, parallel to the spring axis, and wherein in a position of rest, ends of said blades are retracted in said flow-through slots.

8 Claims, 5 Drawing Sheets

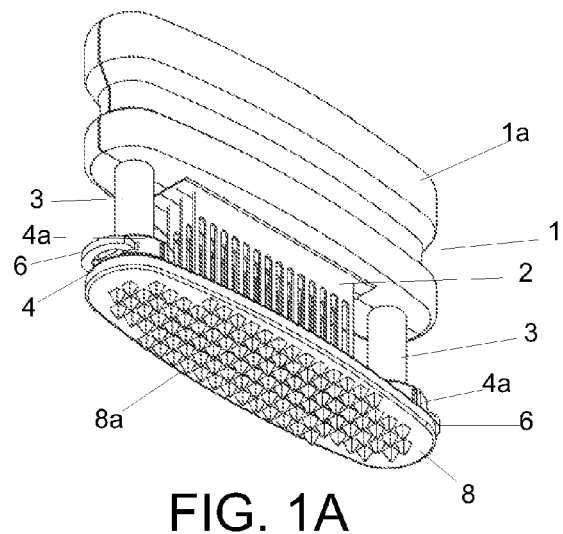
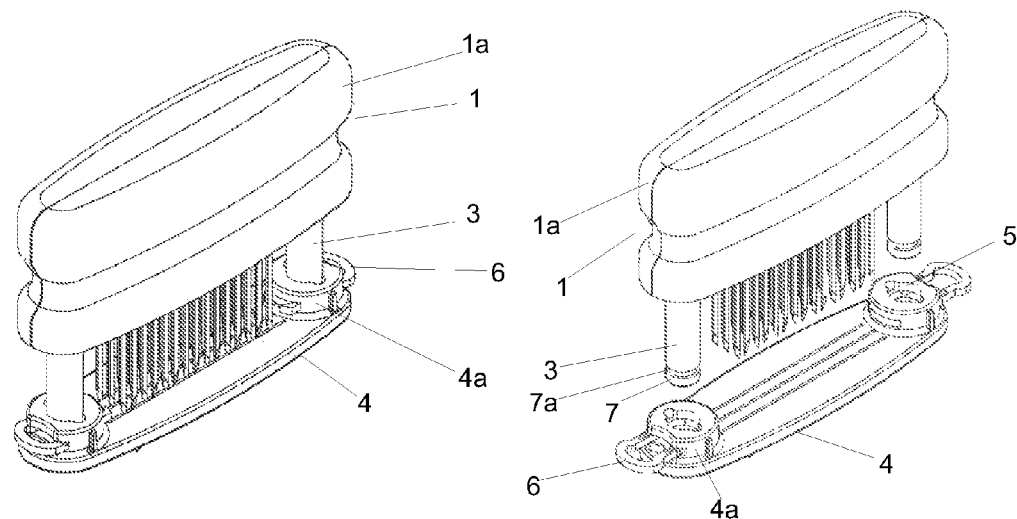
FIG. 1A
FIG. 1B
FIG. 2A

DOUBLE FUNCTION, HAND OPERATED MEAT TENDERIZER WITH QUICK RELEASE CLIP

PRIORITY

This application claims priority to an application entitled MEAT TENDERIZER, filed in the Patent Office of the Republic of Poland on Aug. 26, 2013 and assigned Serial No. P.405130, the contents of which are incorporated herein by reference.

TECHNICAL FIELD

The present disclosure generally relates to a meat tenderizer, and more particularly relates to a double function hand operated meat tenderizer for mechanical loosening of muscle fibers in meat with a quick release clip.

BACKGROUND

Meat tenderizers are known. For example, U.S. Pat. Nos. 4,199,841 and 4,463,476, the contents of which are incorporated herein by reference, disclose hand meat tenderizers. Such a tenderizer comprises a blade assembly and a rectangular plate with flow-through slots and two seats. Inserted in the latter are two cylinders, inside which are compression springs with plungers. Said blade assembly, which comprises a plurality of blade segments, moves slidably along said cylinders. Said blade assembly consists of two symmetrical blade segments, each spaced from the other by spacer blocks. The blades are aligned in parallel relation, longitudinally, with spacer blocks between. Said blade assembly is retained in a handle whose members are secured by bolts. Said bolts are also inset in the through holes of said blade assembly, spacer blocks and blade segments.

Another device for loosening muscle fibers, particularly in meat, is known from Polish patent specification no. PL207291. This device comprises a plate with cylinders retaining springs provided with plungers and a blade assembly comprising a set of blades separated by spacer blocks. The plate, which is flat and oval in a horizontal sectional view, is provided with rows of flow-through slots and projections on the face, preferably truncated pyramid or cone-shaped. Another distinctive feature invention are the notches on the side surfaces areas of said handle, the latter being oval in a horizontal sectional view.

Also patent specification PL211404 describes a similar device for loosening muscle fiber structure in meat. In this invention, at least one set of blades is provided with a holder and/or sets of blades are connected and/or mounted in at least one holder, the latter being locked up in a blade assembly by a mounting unit. The cylinders retained in the blade assembly and the plate itself are secured by the same and/or other mounting unit. The plate comprises a releasably attached plate base with projections on its face, preferably truncated pyramid or cone-shaped. The handle consists of two members secured together by connecting bolts. The mounting unit is a rotating bolt fitted through the in the holder and/or the well of the cylinder. The bottom surface of the holders preferably encases the wells with the cylinders. The bolt secures and holds in position at least one cylinder and/or the plate is provided with an extra cover.

This disclosure describes improvements over these prior art technologies.

SUMMARY

Accordingly, an object of the present disclosure is to provide a meat tenderizer whose main working component is easy to disassemble.

An object of the present disclosure is to provide a plate provided with at least one seat. A cylinder spigot is releasably attached to said seat. The latter is placed in a lug boss. Said cylinder spigot is provided with a recess in the form of a circumferential groove. Alternatively, said recess can be obtained by flattening a section of said cylinder. Said cylinder spigot is attached to said seat by means of a swivel tie nut. Said tie nut is preferably placed in perpendicular position in relation to the axis of said cylinder and fitted in the horizontal cavity of said lug boss.

One of the benefits of the present disclosure is that said plate can be easily detached from said handle, which enables convenient cleaning of said blade segment and its subsequent reattachment to said handle.

A double function, hand operated meat tenderizer with quick release clip includes a handle with a blade segment clamped inside said handle; a generally flat plate attached to said handle by at least one slidably moving cylinder attached to a compressed spring, comprising at least one seat including a releasably attached spigot of the cylinder, wherein an end face of said plate is provided with a plurality of projections and flow-through slots aligned in evenly spaced relation, parallel to the spring axis, and wherein in a position of rest, ends of said blades are retracted in said flow-through slots.

A main benefit of the present disclosure is the reduction in time necessary to disassemble a double function, hand operated meat tenderizer.

BRIEF DESCRIPTION OF THE DRAWINGS

The present disclosure will become more readily apparent from the specific description accompanied by the following drawings, in which:

FIG. 1A is a bottom-side perspective view of the assembled meat tenderizer according to the present disclosure;

FIG. 1B is a bottom-side perspective view of the assembled meat tenderizer according to the present disclosure;

FIG. 2A is a top-side perspective view of the meat tenderizer with the plate detached according to the present disclosure;

Like reference numerals indicate similar parts throughout the figures.

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure.

Figure 1E:
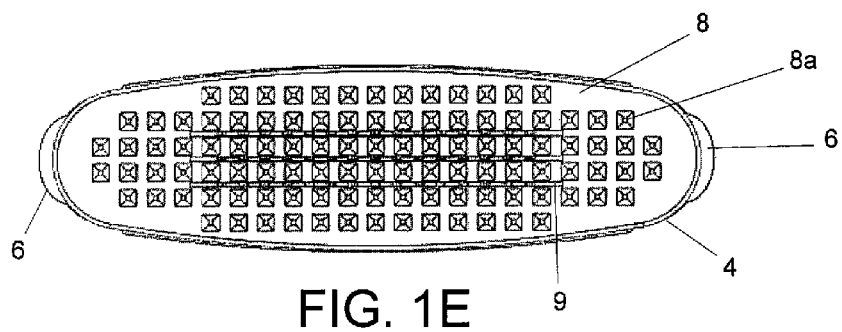
FIG. 1E is a bottom plan view of the assembled meat tenderizer according to the present disclosure.
Figures 1C, 1D:
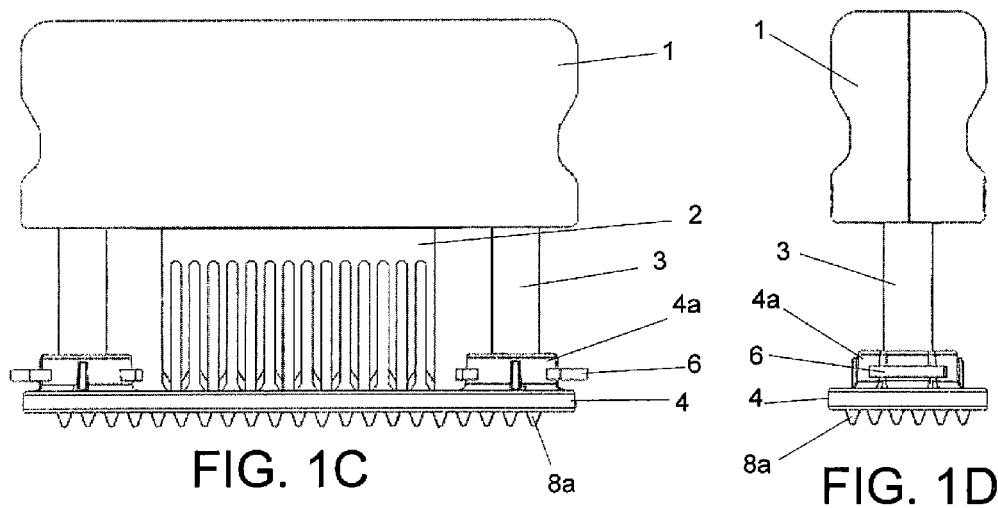
FIG. 1C is a side plan view of the assembled meat tenderizer according to the present disclosure.
FIG. 1D is a side plan view of the assembled meat tenderizer according to the present disclosure.
Figure 1F:
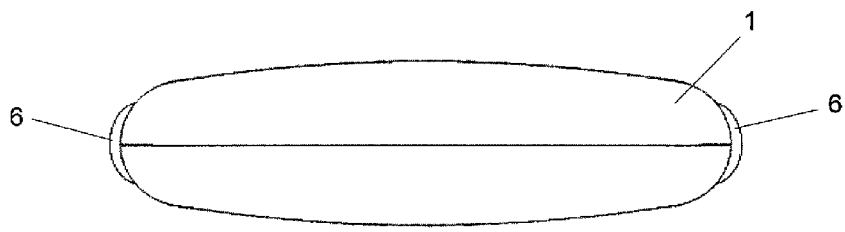
FIG. 1F is a top plan view of the assembled meat tenderizer according to the present disclosure.
Figure 1G:
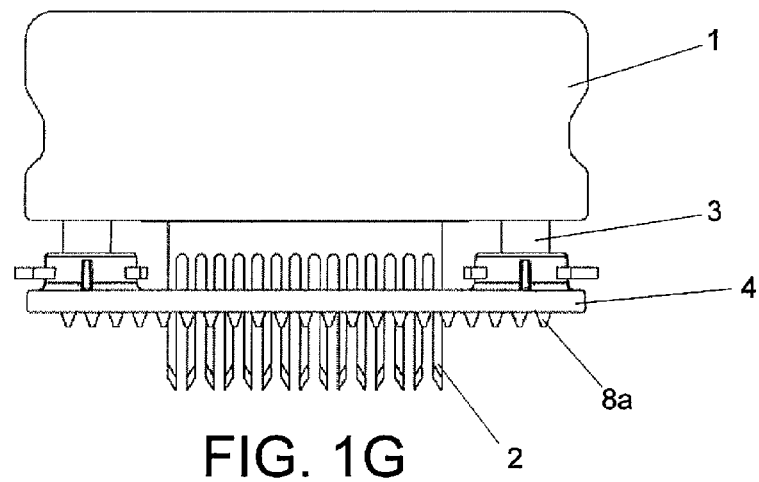
FIG. 1G is a side plan view of the meat tenderizer with blades extended according to the present disclosure.
Figure 1H:
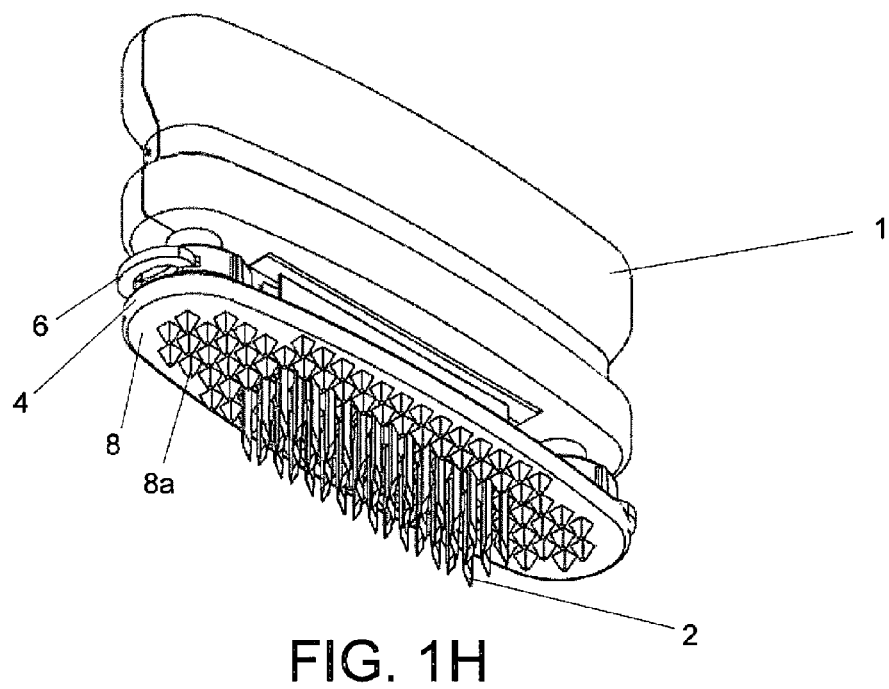
FIG. 1H is a bottom-side perspective view of the meat tenderizer with blades extended according to the present disclosure.
Figure 2D:
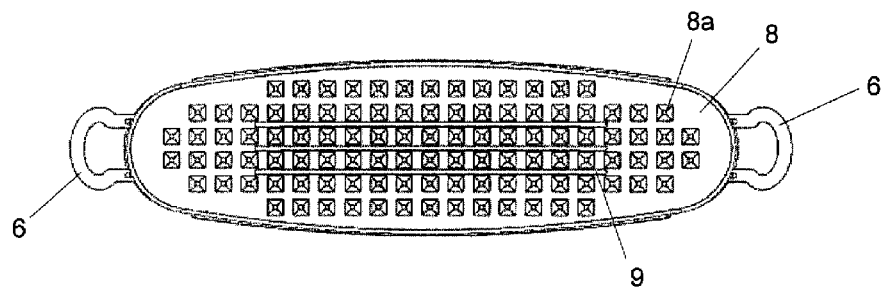
FIG. 2D is a bottom plan view of the meat tenderizer with the plate detached according to the present disclosure.
Figures 2B, 2C:
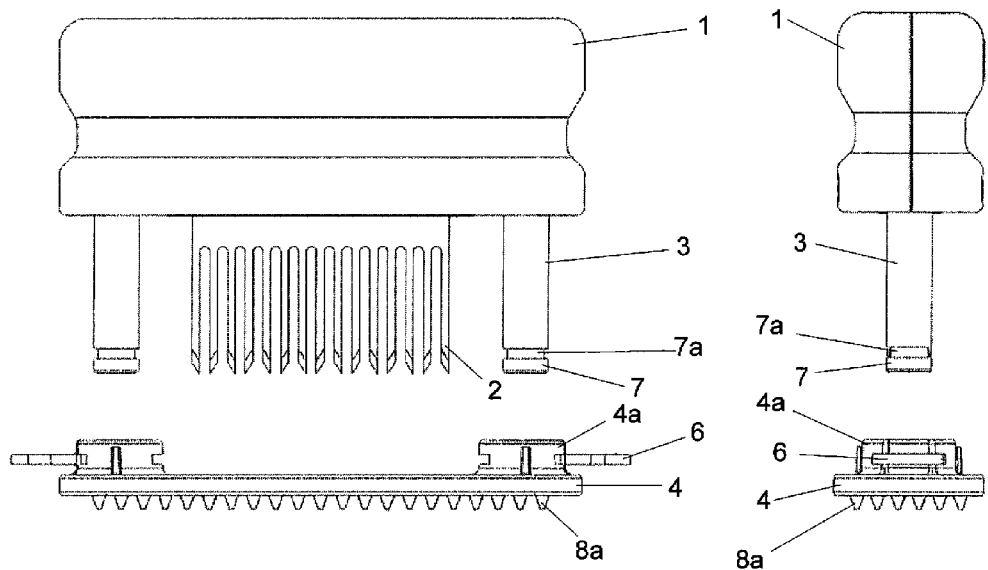
FIG. 2B is a side plan view of the meat tenderizer with the plate detached according to the present disclosure.
FIG. 2C is a side plan view of the meat tenderizer with the plate detached according to the present disclosure.
Figure 2E:
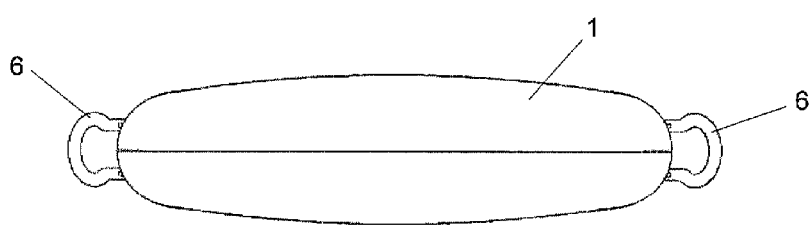
FIG. 2E is a top plan view of the meat tenderizer with the plate detached according to the present disclosure.
Figure 3:
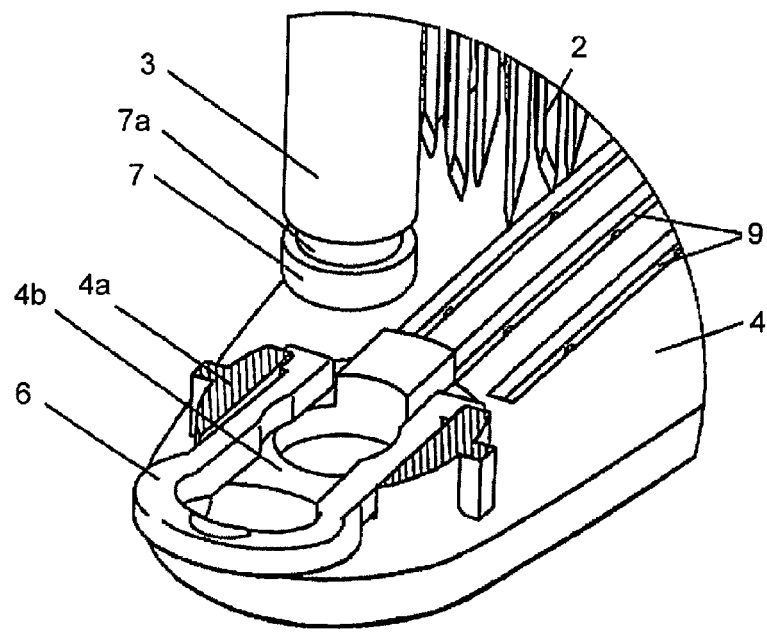
FIG. 3 is a detailed view of the groove on the cylinder spigot, showing the tie nut in the seat.
Figure 4:
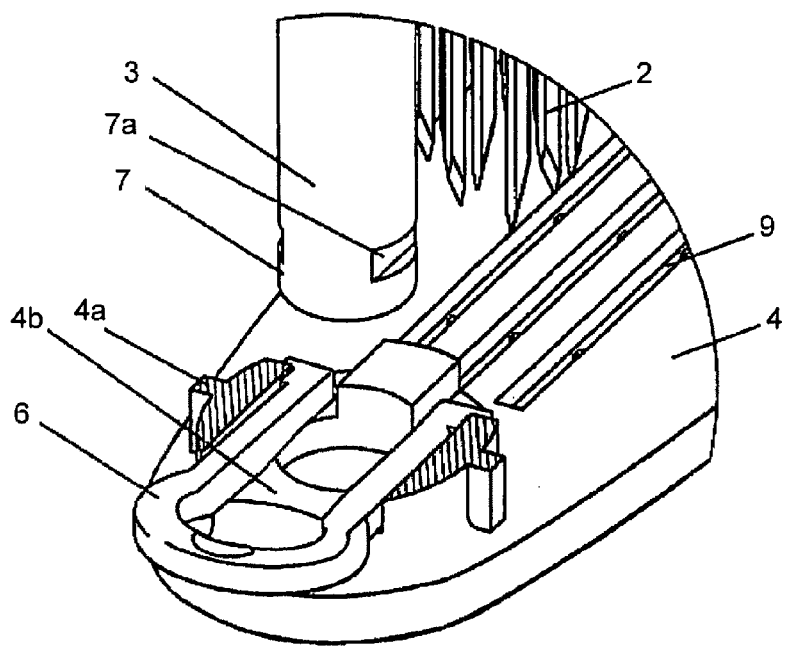
FIG. 4 is a detailed view of the groove on the cylinder spigot where the recess on the spigot is obtained by flattening a section of the cylinder.

The meat tenderizer of this invention comprises handle 1 with blade segment 2 and generally flat plate 4 attached to handle 1 by means of at least one slidably moving cylinder 3 attached to a compressed spring. Blade segment 2 is clamped in the holder encased in handle 1. End face 8 of plate 4 is provided with a plurality of preferably truncated pyramid or cone-shaped projections 8a, and flow-through slots 9 aligned spaced relation and parallel to the spring axis. In the position of rest, the ends of blades 2 are inserted into flow-through slots 9. Plate 4 is provided with at least one seat 5, within which there is releasably attached spigot 7 of cylinder 3. Seat 5 is placed in lug boss 4a of plate 4. Spigot 7 is provided with recess 7a. Said recess 7a has the form of circumferential groove (see FIG. 3). Alternatively, recess 7a can be obtained by flattening of cylinder 3 section (see FIG. 4). Spigot 7 of cylinder 3 is fitted in seat 5 by means of tie nut 6. Tie nut 6 is preferably placed in perpendicular position in relation to the axis of cylinder 3, and fitted both in horizontal cavity 4b of lug boss 4a and recess 7a.

Plate 4 with flow-through slots 9 designed to receive blades 4 is attached to ergonomic handle 1 by means of cylinders 3 sliding in wells of handle 1. One surface 8 of plate 4 is provided with projections 8a. The latter have the shape of truncated pyramids. Side surface of handle 1 is provided with horizontal notches 1a to prevent handle slip in a user's hand. With plate 4 maximally biased away from handle 1, sharp ends of blades 2 are retracted in flow-through slots 9, so that they do not protrude over surface 8 of plate 4. To detach plate 4 from spigots 7 and clean blade segment 2, it is necessary to turn tie nuts 6 in cavities 4b, so that spigots 7 are released and removed from recesses 7a.

While in use, projections on end face 8 of plate 4 penetrate the outer layer of meat and tenderize its cohesiveness.

While the preferred embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. A double function, hand operated meat tenderizer, comprising:
    a handle with a blade segment clamped inside said handle;
    a generally flat plate attached to said handle by at least one slidably moving cylinder attached to a compressed spring, comprising at least one seat including a releasably attached spigot of the cylinder,
    wherein an end face of said plate is provided with a plurality of projections and flow-through slots aligned in evenly spaced relation, parallel to the spring axis, and
    wherein in a position of rest, ends of said blades are retracted in said flow-through slots.

2. The meat tenderizer of claim 1, wherein the plate includes a lug boss including a seat.

3. The meat tenderizer of claim 2, wherein the spigot is attachable in the seat by means of a tie nut.

4. The meat tenderizer of claim 1, wherein the spigot includes a recess.

5. The meat tenderizer of claim 4, wherein said recess has the form of circumferential groove.

6. The meat tenderizer of claim 4, wherein the recess is a flattened section of the cylinder.

7. The meat tenderizer of claim 1, wherein the spigot is attachable in the seat by means of a tie nut.

8. The meat tenderizer of claim 7, wherein the tie nut is positioned perpendicular to the axis of the column and fitted in a horizontal cavity of the lug boss.

* * * * *